(12) United States Patent
Yin et al.

(10) Patent No.: US 10,396,404 B2
(45) Date of Patent: Aug. 27, 2019

(54) ELECTROCHEMICAL CELL WITH BIPOLAR FARADAIC MEMBRANE

(71) Applicants: Massachusetts Institute of Technology, Cambridge, MA (US); Total Marketing Services, Puteaux (FR)

(72) Inventors: Huayi Yin, Cambridge, MA (US); Fei Chen, Wuhan (CN); Brice Hoani Valentin Chung, Boston, MA (US); Takanari Ouchi, Brookline, MA (US); Donald Robert Sadoway, Cambridge, MA (US)

(73) Assignees: Massachusetts Institute of Technology, Cambridge, MA (US); Total S.A., Courbevoie (FR); Total Energies Nouvelles Activites USA, Courbevoie (FR)

( * ) Notice: Subject to any disclaimer, the term of this patent is extended or adjusted under 35 U.S.C. 154(b) by 543 days.

(21) Appl. No.: 15/055,491

(22) Filed: Feb. 26, 2016

(65) Prior Publication Data

US 2016/0254512 A1     Sep. 1, 2016

Related U.S. Application Data

(60) Provisional application No. 62/121,597, filed on Feb. 27, 2015.

(51) Int. Cl.
*H01M 10/39*     (2006.01)
*H01M 2/16*     (2006.01)
(Continued)

(52) U.S. Cl.
CPC ....... *H01M 10/399* (2013.01); *H01M 2/1646* (2013.01); *H01M 2/1673* (2013.01);
(Continued)

(58) Field of Classification Search
None
See application file for complete search history.

(56) References Cited

U.S. PATENT DOCUMENTS 3,238,437 A     3/1966 Foster et al.
3,245,836 A     4/1966 Agruss
(Continued)

FOREIGN PATENT DOCUMENTS

EP     0078404 A2     5/1983     ............ H01M 14/00
EP     0327959 A1     8/1989     ............ H01M 10/14
(Continued)

OTHER PUBLICATIONS

Fujiwara, Syozo, et al., "New molten salt systems for high temperature molten salt batteries: Ternary and quaternary molten salt systems based on LiF—LiCl, LiF—LiBr, and LiCl—LiBr," Journal of Power Sources, vol. 196, pp. 4012-4018, Dec. 14, 2010.
(Continued)

*Primary Examiner* — Ula C Ruddock
*Assistant Examiner* — Tony S Chuo
(74) *Attorney, Agent, or Firm* — Sunstein Kann Murphy & Timbers LLP

(57) ABSTRACT

An electrochemical cell includes a negative electrode having a first liquid phase having a first active metal, a positive electrode having a second liquid phase having a second active metal, and a liquid electrolyte having a salt of the first active metal and a salt of the second active metal. The electrochemical cell also includes a bipolar faradaic membrane, disposed between the negative electrode and the positive electrode, having a first surface facing the negative electrode and a second surface facing the positive electrode. The bipolar faradaic membrane is configured to allow cations of the first active metal to pass through and to impede cations of the second active metal from transferring from the
(Continued)

positive electrode to the negative electrode and is at least partially formed from a material having an electronic conductivity sufficient to drive faradaic reactions at the second surface with the cations of the positive electrode.

20 Claims, 10 Drawing Sheets

(51) Int. Cl.
  *H01M 4/38* (2006.01)
  *H01M 4/40* (2006.01)
(52) U.S. Cl.
  CPC .............. *H01M 4/38* (2013.01); *H01M 4/382* (2013.01); *H01M 4/387* (2013.01); *H01M 4/405* (2013.01); *H01M 2300/0057* (2013.01)

(56) References Cited

U.S. PATENT DOCUMENTS

| | | | |
|---|---|---|---|
| 3,419,432 A | 12/1968 | Hesson | |
| 3,488,221 A | 1/1970 | Shimotake et al. | |
| 3,535,214 A | 10/1970 | Winand | |
| 3,663,295 A | 5/1972 | Baker | |
| 3,716,409 A | 2/1973 | Cairns et al. | |
| 3,775,181 A | 11/1973 | Ryerson | |
| 3,833,421 A | 9/1974 | Rubischko et al. | |
| 3,933,521 A | 1/1976 | Vissers et al. | |
| 3,954,504 A * | 5/1976 | Zellhoefer | H01M 6/36 429/103 |
| 4,011,374 A | 3/1977 | Kaun | |
| 4,216,273 A | 8/1980 | Cadart et al. | |
| 4,999,097 A | 3/1991 | Sadoway | |
| 5,185,068 A | 2/1993 | Sadoway | |
| 5,476,733 A | 12/1995 | Coetzer et al. | |
| 5,714,283 A * | 2/1998 | Briscoe | H01M 2/14 429/210 |
| 6,368,486 B1 | 4/2002 | Thompson et al. | |
| 6,730,210 B2 | 5/2004 | Thompson et al. | |
| 6,733,924 B1 | 5/2004 | Skotheim et al. | |
| 7,504,017 B2 | 3/2009 | Cardarelli | |
| 7,678,484 B2 | 3/2010 | Tao et al. | |
| 8,178,231 B2 | 5/2012 | Soloveichik et al. | |
| 8,202,641 B2 | 6/2012 | Winter et al. | |
| 8,268,471 B2 | 9/2012 | Sadoway et al. | |
| 8,323,816 B2 | 12/2012 | Bradwell et al. | |
| 8,460,814 B2 | 6/2013 | Deane et al. | |
| 8,764,962 B2 | 7/2014 | Allanore et al. | |
| 9,000,713 B2 | 4/2015 | Boysen et al. | |
| 9,076,996 B2 | 7/2015 | Bradwell et al. | |
| 2003/0228520 A1 | 12/2003 | Kaun | |
| 2007/0215483 A1 | 9/2007 | Johansen et al. | |
| 2008/0023321 A1 | 1/2008 | Sadoway | |
| 2008/0044725 A1 | 2/2008 | Sadoway et al. | |
| 2008/0053838 A1 | 3/2008 | Yamaguchi et al. | |
| 2008/0145755 A1 | 6/2008 | Iacovangelo et al. | |
| 2010/0047671 A1 | 2/2010 | Chiang et al. | |
| 2010/0291443 A1* | 11/2010 | Farmer | H01M 4/133 429/304 |
| 2011/0014503 A1 | 1/2011 | Bradwell et al. | |
| 2011/0014505 A1 | 1/2011 | Bradwell et al. | |
| 2011/0200848 A1 | 8/2011 | Chiang et al. | |
| 2012/0104990 A1 | 5/2012 | Boysen et al. | |
| 2012/0264021 A1 | 10/2012 | Sugiura et al. | |
| 2013/0059176 A1 | 3/2013 | Stefani et al. | |
| 2013/0065122 A1 | 3/2013 | Chiang et al. | |
| 2013/0071306 A1 | 3/2013 | Camp et al. | |
| 2014/0099522 A1 | 4/2014 | Spatocco et al. | |
| 2014/0113181 A1 | 4/2014 | Bradwell et al. | |
| 2014/0272481 A1 | 9/2014 | Chung et al. | |
| 2015/0004455 A1 | 1/2015 | Bradwell et al. | |
| 2015/0015210 A1 | 1/2015 | Bradwell et al. | |
| 2015/0132627 A1 | 5/2015 | Bradwell et al. | |
| 2015/0132628 A1 | 5/2015 | Bradwell et al. | |
| 2015/0214579 A1 | 7/2015 | Boysen et al. | |
| 2015/0303525 A1 | 10/2015 | Bradwell et al. | |

FOREIGN PATENT DOCUMENTS

| | | | | |
|---|---|---|---|---|
| EP | 0343333 A1 | 11/1989 | ............. | H01M 2/06 |
| EP | 1096593 A2 | 5/2001 | | |
| JP | 55-53877 | 4/1980 | ............ | H01M 10/36 |
| JP | 55-53877 A | 4/1980 | ............ | H01M 10/36 |
| JP | 2001-115369 | 4/2001 | ............... | D04H 1/46 |
| JP | 2001-115369 A | 4/2001 | ............... | D04H 1/46 |
| WO | WO 2008/105811 A2 | 9/2008 | | |
| WO | WO 2011/014242 A1 | 2/2011 | ............. | H01M 2/14 |
| WO | WO 2011/014243 A1 | 2/2011 | ............. | H01M 2/14 |
| WO | WO 2014/062706 A1 | 4/2014 | ............ | H01M 10/50 |
| WO | WO 2014/190318 A1 | 11/2014 | ............ | H01M 10/04 |

OTHER PUBLICATIONS

Shannon, R.D., Revised Effective Ionic Radii and Systematic Studies of Interatomic Distances in Halides and Chalcogenides, Acta Cryst., vol. A32, pp. 751-767, Mar. 9, 1976.

International Searching Authority, International Search Report—International Application No. PCT/US2016/019970 dated Jun. 1, 2016, together with the Written Opinion of the International Searching Authority, 21 pages.

Agruss, "The Thermally Regenerative Liquid-Metal Cell," Journal of the Electrochemical Society, vol. 110, No. 11, pp. 1097-1103, Nov. 1963.

Allanore, "A new anode material for oxygen evolution in molten oxide electrolysis," Nature, vol. 497, pp. 353-356, May 16, 2013.

Allanore, "Features and Challenges of Molten Oxide Electrolytes for Metal Extraction," Journal of The Electrochemical Society, vol. 162, No. 1, pp. E13-E22, Nov. 25, 2014.

Atthey, "A Mathematical Model for Fluid Flow in a Weld Pool at High Currents," J. Fluid Mech.,vol. 98, Part 4, pp. 787-801, 1980.

Bradwell, "Technical and Economic Feasibility of a High-Temperature Self-Assembling Battery," Thesis, Massachusetts Institute of Technology, Department of Materials Science and Engineering, 136 pages, Sep. 2006.

Bradwell, "Liquid Metal Batteries: Ambipolar Electrolysis and Alkaline Earth Electroalloying Cells," Thesis, Massachusetts Institute of Technology, Department of Materials Science and Engineering, 206 pages, Feb. 2011.

Bradwell et al., "Recycling ZnTe, CdTe, and Other Compound Semiconductors by Ambipolar Electrolysis," Journal of the American Chemical Society, vol. 133, pp. 19971-19975, Oct. 28, 2011.

Bradwell et al., "Supporting Information: Recycling ZnTe, CdTe, and Other Compound Semiconductors by Ambipolar Electrolysis," Journal of the American Chemical Society, pp. S1-S8, Oct. 28, 2011.

Cairns et al., "Galvanic Cells with Fused-Salt Electrolytes," AEC Research and Development, Argonne National Laboratory, Chemical Engineering Division, 44 pages, Nov. 1967.

Cairns et al., "High-Temperature Batteries—Research in high-temperature electrochemistry reveals compact, powerful energy-storage cells," Science, vol. 164, No. 3886, pp. 1347-1355, Jun. 20, 1969.

Cubicciotti et al., "Metal—Salt Interactions at High Temperatures: The Solubilities of Some Alkaline Earth Metals in their Halides," Journal of the American Chemical Society, vol. 71, No. 6, pp. 2149-2153, 1949.

Dworkin et al., "The Electrical Conductivity of Solutions of Metals in Their Molten Halides," The Journal of Physical Chemistry, vol. 70, No. 7, pp. 2384-2388, Jul. 1966.

Electroville, Grid-Scale Batteries, ARPA-E, MIT Electroville: High Amperage Energy Storage Device—Energy for the Neighborhood, http://arpa-e.energy.gov/?q=slick-sheet-project/electroville-grid-scale-batteries, 1 page, Accessed Jul. 2, 2015.

U.S. Department of Energy, U.S. Department of Energy Categorical Exclusion Determination Form, ARPA-E, 25A/1089-Electroville: High-Amperage Energy Storage Device—Energy Storage for the Neighborhood, 2 pages, Jan. 15, 2010.

(56) References Cited

OTHER PUBLICATIONS

Gay et al., "Lithium/Chalcogen Secondary Cells for Components in Electric Vehicular-Propulsion Generating Systems," Argonne National Laboratory, Argonne, Illinois, ANL-7863, 62 pages, Jan. 1972.
Jarrett et al., "Advances in the Smelting of Aluminum," Aluminum Company of America, Metallurgical Treatises, Warrendale, Pennsylvania: The Metallurgical Society of AIME, pp. 137-157, 1981.
Kim et al., "Electrolysis of Molten Iron Oxide with an Iridium Anode: The Role of Electrolyte Basicity," Journal of the Electrochemical Society, vol. 158, No. 10, pp. E101-E105, Aug. 5, 2011.
Kim et al., "Liquid Metal Batteries: Past, Present, and Future," Chemical Reviews, vol. 113, No. 3, Mar. 13, 2013, pp. 2075-2099.
Kipouros et al., "Toward New Technologies for the Production of Lithium," JOM, pp. 24-26, May 1998.
Pongsaksawad et al., "Phase-Field Modeling of Transport-Limited Electrolysis in Solid and Liquid States," Journal of the Electrochemical Society, vol. 154, No. 6, pp. F122-F133, 2007.
Sadoway, "The Electrochemical Processing of Refractory Metals," JOM, pp. 15-19, Jul. 1991.
Sadoway, "New opportunities for waste treatment by electrochemical processing in molten salts," Metals and Materials Waste Reduction, Recovery and Remediation, Edited by K.C. Liddell, R.G. Bautista and R.J. Orth, The Minerals, Metals & Materials Society, pp. 73-76, 1994.
Sadoway, "New opportunities for metals extraction and waste treatment by electrochemical processing in molten salts," J. Mater. Res., vol. 10, No. 3, pp. 487-492, Mar. 1995.
Sadoway, A Technical Feasibility Study of Steelmaking by Molten Oxide Electrolysis, presented at 9th AISI/DOE TRP Industry Briefing Session, 16 pages, Oct. 10, 2007.
Sadoway, "Block and graft copolymer electrolytes for high-performance, solid-state, lithium batteries," Journal of Power Sources, Elsevier, vol. 129, No. 1, Apr. 15, 2004, pp. 1-3.
Shimotake et al., "Bimetallic Galvanic Cells With Fused-Salt Electrolytes," Argonne National Laboratory, Argonne, Illinois, pp. 951-962, 1967.
Shimotake et al., "Secondary Cells with Lithium Anodes and Immobilized Fused-Salt Electrolytes," I&EC Process Design and Development, vol. 8, No. 1, pp. 51-56, Jan. 1969.
Villar, "Assessment of High-Temperature Self-Assembling Battery Implementation based on the Aluminum Smelting Process," Thesis, Massachusetts Institute of Technology, Department of Materials Science and Engineering, 129 pages, Sep. 2010.
Weaver et al., "The Sodium|Tin Liquid-Metal Cell," Journal of the Electrochemical Society, vol. 109, No. 8, pp. 653-657, Aug. 1962.

\* cited by examiner

ELECTROCHEMICAL CELL WITH BIPOLAR FARADAIC MEMBRANE

CROSS-REFERENCE TO RELATED APPLICATIONS

This patent application claims the benefit of U.S. Provisional Patent Application No. 62/121,597 filed Feb. 27, 2015, the disclosure of which is incorporated by reference herein in its entirety.

TECHNICAL FIELD

The present invention relates to galvanic electrochemical cells for use in dynamic storage of energy, and more particularly to these galvanic cells operating at high currents.

BACKGROUND

Electrical energy generation in the United States relies on a variety of energy sources such as fossil, nuclear, solar, wind and hydroelectric. With the concern of the dwindling supply of fossil fuel, one of the great challenges of energy supply chains is balancing supply with demand. In particular, managing the intrinsic intermittency of renewable sources of energy such as wind or solar is key to enable their adoption at large scale. Part of the problem is the inability to store electrical energy in an efficient and cost effective way. Electrochemical cells using liquid metals in alloying/dealloying reactions have been developed but generally operate at low voltages of about 1 volt or less. Enabling higher voltage cells while retaining the use of low cost materials would significantly decrease the cost of these devices and further improve their efficiency.

Ion selective membranes have been used as separators in electrochemical cell systems. For example, in a traditional zebra (Na/NiCl$_2$) battery, an ion selective Na+ conductive β"-alumina ceramic membrane may be inserted between the electrodes to prevent the reaction of Na with the electrolyte as well as the irreversible back reaction of Ni$^{2+}$ upon direct contact with the negative Na electrode. During charging, the solid Ni is oxidized to Ni$^{2+}$ ion at the positive electrode while Na$^+$ is reduced to liquid Na at the negative electrode. Ideally, an ion selective membrane should be as thin as possible so that its electrical resistance is as low as possible in order to allow maximum current to flow. However, a thin membrane is difficult to manufacture without pinholes, and a thin membrane lacks structural integrity and is subject to mechanical failure. Thus, these types of membranes have operational and manufacturing issues. For example, in the zebra (Na/NiCl$_2$) battery, the drawbacks of the β"-alumina ceramic membrane are (1) the membrane requires a complex manufacturing process that includes many steps, high temperature sintering and a controlled environment to achieve the intricacy of the β" crystal structure; (2) the membrane is mechanically vulnerable and limits the lifetime of the battery, e.g., by failure under repeated thawing; (3) the thin ceramic membrane is fragile and increasingly vulnerable at larger scale; (4) the membrane requires minimal operating temperature, e.g., >200° C., to be practical because of its limited conductivity; and (5) the membrane is limited to Na$^+$ itinerant ions.

SUMMARY OF THE EMBODIMENTS

In a first embodiment of the invention, an electrochemical cell includes two electrodes, a first electrode having a first active metal and a second electrode having a second active metal, a metal or metalloid, and a liquid electrolyte disposed between the first and second electrodes. The electrolyte includes a salt of the first active metal and a salt of the second active metal. The electrochemical cell further includes a bipolar faradaic membrane disposed between the first and second electrodes, having a first surface facing the negative electrode and a second surface facing the positive electrode. The bipolar faradaic membrane is configured to allow cations of the first active metal to pass through and impede cations of the second active metal from transferring from the positive electrode to the negative electrode and is at least partially formed from a material having an electronic conductivity sufficient to drive faradaic reactions at the second surface with the cations of the positive electrode.

In accordance with another embodiment of the invention, a method of exchanging electrical energy with an external circuit includes providing an electrochemical cell, such as disclosed above, connecting the electrochemical cell to the external circuit, and operating the external circuit so as to drive transfer of electrons between the negative electrode and the positive electrode.

In some embodiments, the bipolar faradaic membrane is configured to have the first surface positively charged and the second surface negatively charged. The positively charged first surface and the negatively charged second surface may be electrostatically induced. The electronic conductivity of the material is greater than or equal to $10^{-10}$ S/m at operating temperature of the electrochemical cell. The bipolar faradaic membrane may be permeable to passive spectator ions. The bipolar faradaic membrane may be titanium nitride, zirconium nitride, titanium diboride, graphite, grapheme, metals, and/or metalloids. The bipolar faradaic membrane may be copper, titanium, iron, nickel, tungsten, tantalum, molybdenum, and/or silicon. The bipolar faradaic membrane may be nickel-iron foam, copper foam, carbon foam, metal felt, metallic fibers, steels, and/or alloys. The bipolar faradaic membrane may further include a sintering additive, such as magnesium oxide, aluminum oxide, aluminum nitride, silicon nitride, and/or silicon oxide. The bipolar faradaic membrane may be an electronically conductive matrix having an insulator and conductive particles. The insulator may be magnesium oxide, aluminum oxide, silicon oxide, aluminum nitride, silicon nitride, silicon oxynitride, polymers, and combinations thereof. The bipolar faradaic membrane may include an electronic pathway across the bipolar faradaic membrane, such as iron, steel, and/or graphite. The negative electrode may be sodium, lithium, magnesium, and/or calcium. The positive electrode may be lead, zinc, tin, bismuth, and/or antimony. The bipolar faradaic membrane may be in direct contact with the negative electrode. The electrolyte may be between the negative electrode and the bipolar faradaic membrane and between the bipolar faradaic membrane and the positive electrode. The electrochemical cell may be a Li/PbCl$_2$ electrochemical cell. The negative electrode may be an alloy and the electrochemical cell may be a LiPb∥PbCl$_2$ electrochemical cell, a LiBi∥PbCl$_2$ electrochemical cell, a LiPb∥SnCl$_2$ electrochemical cell, a LiSn∥SnCl$_2$ electrochemical cell, a Li—Pb∥PbBr$_2$ electrochemical cell, a Mg—Pb∥PbCl$_2$ electrochemical cell, or a Mg—Sn∥PbCl$_2$ electrochemical cell. The negative electrode may be contained in an electronically conductive container. The electrolyte may be LiCl—KCl, LiBr—KBr, or LiCl—LiBr—KBr.

BRIEF DESCRIPTION OF THE DRAWINGS

The foregoing features of embodiments will be more readily understood by reference to the following detailed description, taken with reference to the accompanying drawings, in which:

FIG. 3A shows when the cell is discharged, FIG. 3B shows when the cell is in operation and connected to a source of energy (charging circuit), and FIG. 3C shows when the cell is fully charged.

DETAILED DESCRIPTION OF SPECIFIC EMBODIMENTS

Figure 1:
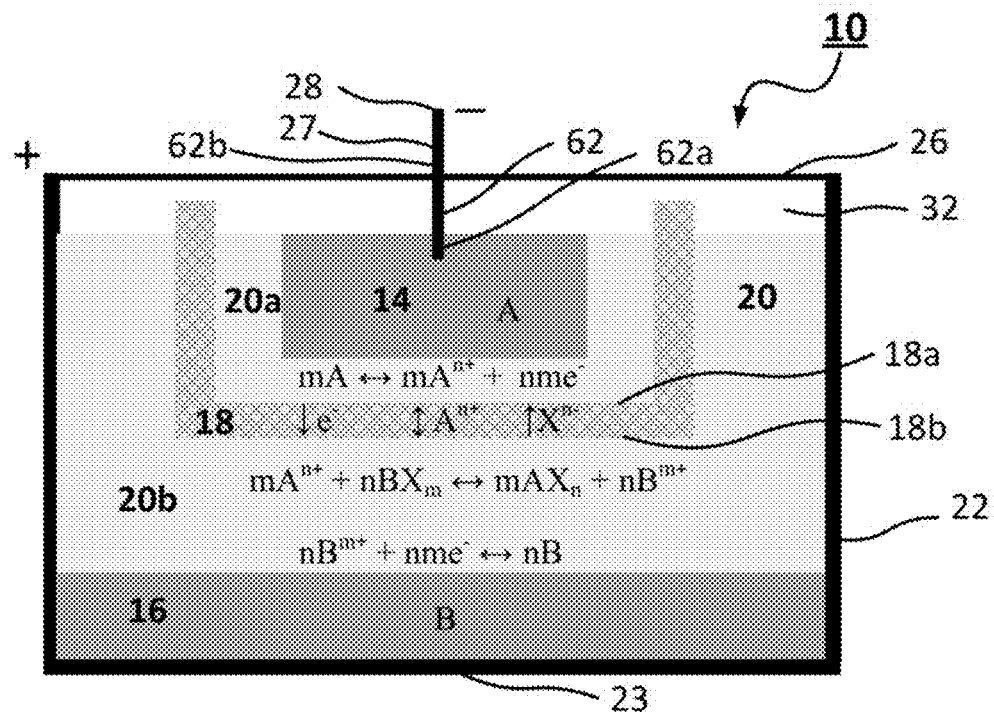
FIG. 1 is a vertical cross-sectional view showing an electrochemical cell with a bipolar faradaic membrane according to embodiments of the present invention.

Embodiments of the present invention include displacement salt reaction liquid metal electrochemical cells having a bipolar faradaic membrane. The displacement cell is described in U.S. Pat. Appl. Publ. No. 2014/0272481, which is incorporated by reference herein in its entirety. The electrochemical cell configuration with the bipolar faradaic membrane facilitates electrochemical cell faradaic reactions, which represents a notable departure from using ionically conductive separators that just passively inhibit passage of all but one type of ion. The bipolar faradaic membrane is disposed between the positive and negative electrodes, is electronically conductive, and prevents irreversible back reaction. The bipolar faradaic membrane does not operate as an ion-selective membrane, but rather as a porous bipolar electrode having, in one embodiment, one electrostatically induced positively charged surface and one electrostatically induced negatively charged surface. The charged surfaces drive spontaneous protective charge transfer reactions. The bipolar faradaic membrane has a sufficient conductive pathway available to electrons between the top and bottom surfaces of the bipolar faradaic membrane to drive faradaic reactions at the bottom surface with the cations of the positive electrode and thus allow the protective charge transfer reaction to occur. In addition, a porous material may be used in the bipolar faradaic membrane design in order to slow down diffusion of positive salt cations while still allowing electrolytic contact of the itinerant ion (i.e., the negative electrode cation) and salt anion. The electrolytic contact may be established in the pores of the bipolar faradaic membrane, and the pores may be selected so that certain smaller ions are allowed to pass through the pores, while larger ions are inhibited from passing through.

For example, in the case of a Li/LiCl—KCl/Pb cell, on one surface of the bipolar faradaic membrane, Li metal dissolved in the electrolyte can be oxidized back to Li$^+$ (LiCl). The released electron can short through the conductive bipolar faradaic membrane and combine with Pb$^{2+}$ (PbCl$_2$) at the other surface of the bipolar faradaic membrane to form liquid Pb, which drops back to the Pb positive electrode. Therefore, the bipolar faradaic membrane functions as a dynamic ion selector permeable to the negative electrode ion (in this example Li$^+$) and salt anion (in this example Cl$^-$) while impeding the positive salt cation (in this example Pb$^{2+}$). Although the bipolar reaction occurs at the expense of a decrease in cell voltage, the attendant suppression of irreversible capacity fade enables the cell to operate for a long service lifetime (many years) while maximizing round-trip efficiency. Details of illustrative embodiments are discussed below.

As used herein, the term "battery" may encompass individual electrochemical cells or cell units having a positive electrode, a negative electrode, and an electrolyte, as well as configurations having an array of electrochemical cells.

Figure 2:
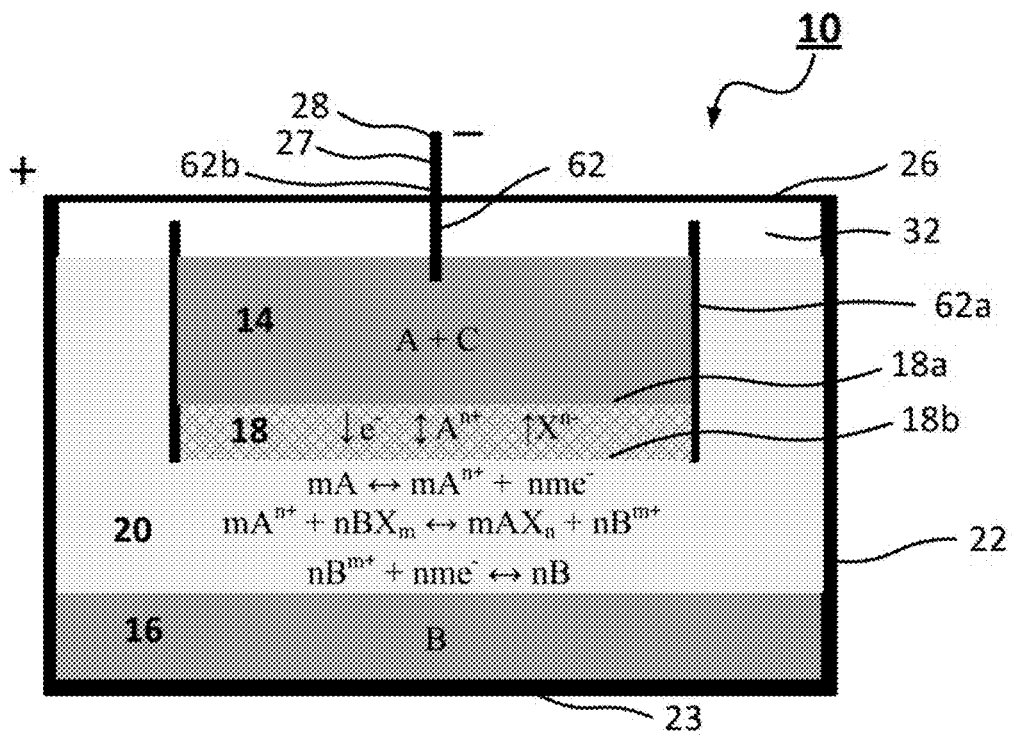
FIG. 2 is a vertical cross-sectional view showing another configuration of an electrochemical cell with a bipolar faradaic membrane according to embodiments of the present invention.

FIGS. 1 and 2 show an electrochemical cell or battery 10, according to embodiments of the present invention, having an electronically conductive layer or negative electrode 14 with an active metal A and an electronically conductive layer or positive electrode 16 with a metallic or metalloid element or alloy B. These electrodes 14, 16 cooperate to efficiently store and deliver energy across an ionically conductive layer or electrolyte 20 (e.g., shown as 20a and 20b in FIG. 1). In embodiments of the present invention, the stored energy relies on the difference of a thermodynamically unfavorable displacement of an anodic salt $AX_n$ (e.g., LiCl) by a cathodic salt $BX_m$ (e.g., $PbCl_2$) in the electrolyte 20, such as described in U.S. Pat. Appl. Publ. No. 2014/0272481.

The anode or negative electrode 14 metal A, preferably weakly electronegative, tends to form stronger ionic bonds with anions, e.g., like halides. The anode metal may include alloys or elements of the alkali and alkaline earth metals (e.g., Li, Na, Ca, Mg, Sr, Ba) although stronger electronegative metals, such as Pb, Bi, Sn, Zn, Sb, Hg and alloys thereof (e.g., SbPb, LiPb, MgPb, MgSn, LiSn, LiBi) may also be used. The cathode or positive electrode 16 metal B may be selected among strongly electronegative metals, metalloids or transition metals (e.g., Pb, Sb, Bi, Sn, Al, Fe, Ni, Cu, Cr, Zn, and alloys thereof), which tend to form weaker bonds with anions, e.g., like halides and others. The electrolyte 20 may include a mixture of halide salts appropriately formulated so as to form a low melting liquid electrolyte 20. For example, the electrolyte 20 may be a eutectic mixture of halides, for example chlorides, or bromides or both, e.g., LiCl—KCl, LiBr—KBr, LiCl—LiBr—KBr. In addition to the principal constituents of the salt, additives such as iodide and sulfide may be added into the electrolyte 20 to improve the cell 10 performance. At the operating temperature of the electrochemical cell 10, the negative and positive electrodes 14, 16 are all-liquid phase or a combination of liquid and solid phases during operation, and the electrolyte 20 is liquid phase during operation.

The electrochemical cell 10 further includes a bipolar faradaic membrane 18 disposed between the negative electrode 14 and positive electrode 16 having a first surface 18a that faces the negative electrode 14 and a second surface 18b that faces the positive electrode 16. In some embodiments, the first surface 18a is positively charged and the second surface 18b is negatively charged. The charged surfaces 18a, 18b may be electrostatically induced by the upper and lower electrodes 14, 16. The bipolar faradaic membrane 18 separates the electrolyte contacting the positive electrode 16 from the negative electrode 14. In the FIG. 1 configuration, the bipolar faradaic membrane 18 is disposed within the electrolyte 20, so that electrolyte 20a is between the negative electrode 14 and the bipolar faradaic membrane 18 and electrolyte 20b is between the bipolar faradaic membrane 18 and the positive electrode 16. In the FIG. 2 configuration, the negative electrode 14 includes an alloy (designated A+C) and the bipolar faradaic membrane 18 is in direct contact with the negative electrode 14. In both cases, the bipolar faradaic membrane 18 is porous and functions as a dynamic ion selector, allowing the smaller cations, $A^{n+}$, of metal A, the first active metal, to pass through the bipolar faradaic membrane 18 along with the electrolyte anion and any spectator anions, and impeding cations, $B^{m+}$, of metal B, the second active metal, from coming in contact with the negative electrode 14. For example, in the FIG. 1 configuration, the pore size may be, e.g., greater than or equal to about 0.5 nm and preferably less than or equal to about the size of the cation of the positive electrode 16. In the FIG. 2 configuration, the pore size may be, e.g., greater than or equal to about 0.5 nm and preferably less than the size of metal A in the negative electrode 14 so as to prevent the metal A from entering the pores of the bipolar faradaic membrane 18. The bipolar faradaic membrane 18 is at least partially formed from a material having an electronic conductivity sufficient to drive the faradaic reactions at the lower surface 18b of the bipolar faradaic membrane 18. For example, the electronic conductivity may be greater than or equal to about $10^{-10}$ S/m at the operating temperature of the electrochemical cell. The combination of electronic conductivity of the bipolar faradaic membrane 18 body and its porosity to cations of the negative electrode 14 should outpace the arrival of cations of the positive electrode 16 to the lower surface 18b of the bipolar faradaic membrane 18 so that the faradaic reactions at the lower surface 18b of the bipolar faradaic membrane 18 allow sufficient protective charge transfer reactions to occur.

For example, in a $Li//PbCl_2$ cell configuration such as shown in FIG. 1, the bipolar faradaic membrane 18 allows the transfer of ions, such as $Li^+$ and through the bipolar faradaic membrane 18 while effectively blocking the larger $PbCl_4^{2-}$ (complexed $Pb^{2+}$ ions) to the negative electrode 14 chamber by concurrent processes of oxidation of solvated Li at the top 18a of the bipolar faradaic membrane 18, electron conduction through the bipolar faradaic membrane 18, and reduction of $Pb^{2+}$ ions at the bottom 18b of the bipolar faradaic membrane 18. Specifically, the Li metal dissolved in the electrolyte 20 oxidizes back to $Li^+$ (LiCl) in a faradaic reaction on the upper surface 18a of the bipolar faradaic membrane 18 towards the negative electrode 14. The released electron shorts through the bipolar faradaic membrane 18 and combines with $Pb^{2+}$ ($PbCl_2$) at the lower surface 18b in a faradaic reaction to form liquid Pb. The reduced liquid Pb at the bottom 18b of the bipolar faradaic membrane 18 then drops back to the positive electrode 16 Pb pool, enabling a sustainable protection process. To prevent $Pb^{2+}$ cross-over to the negative electrode 14 chamber, the rate of solvated Li reaching the top 18a of bipolar faradaic membrane 18 should equal or exceed the $Pb^{2+}$ rate reaching the bottom 18b of the bipolar faradaic membrane 18. The electrochemical cells 10 are designed to operate such that the protective charge transfer reaction is not rate limited by the transport of solvated Li but rather limited by the transport of $Pb^{2+}$.

To address this issue, the bipolar faradaic membrane 18 may be disposed directly adjacent to the negative electrode 14, such as shown in FIG. 2. For example, in a $LiPb//PbCl_2$ cell configuration such as shown in FIG. 2, the reduction of $Pb^{2+}$ to Pb metal in a faradaic reaction at the bottom of the bipolar faradaic membrane 18 occurs with the corresponding oxidation of Li (in the LiPb alloy in the negative electrode 14) to $Li^+$ ion in a faradaic reaction at the top 18a of the bipolar faradaic membrane 18. By allowing the negative electrode 14 to directly contact the bipolar faradaic membrane 18, the LiPb negative electrode 14 provides a superabundance of negative Li reductant to supply electrons to the bottom surface 18b of the bipolar faradaic membrane 18 at a rate only as required by the arrival of $Pb^{2+}$. The process can be viewed as an indirect metallothermic reduction consisting of two half reactions of Li oxidation from Li-alloys (on one surface 18a of the bipolar faradaic membrane 18), and $Pb^{2+}$ reduction to Pb metal by electron transfer through the bipolar faradaic membrane 18 (on the opposite side 18b of the bipolar faradaic membrane 18). Although the redox reaction somewhat sacrifices the charged capacity of the cell 10, the reduced liquid Pb at the bottom 18b of the bipolar faradaic membrane 18 drops back to the positive electrode 16 Pb pool at which point the Pb once again becomes available for charge (reversible protection process). Further-more, by reducing the solubility and diffusivity of $Pb^{2+}$, round-trip efficiency can be maximized as demonstrated in the Examples shown below.

The advantages of embodiments of the electrochemical cell 10 with the bipolar faradaic membrane 18 shown in FIG. 2 include the fact that the rate of protective charge transfer is not limited by the dissolution rate of the negative electrode 14 or the transport of the dissolved metal to the upper surface of the bipolar faradaic membrane. Additionally, in such embodiments the reactivity of A is reduced by alloying with metal C, e.g., Pb, Sn, Bi, reducing the activity of A in the negative electrode 14, which lowers the corrosion against secondary cell components from A. This results in a wider range of materials suitable for seal materials. There is no need for an electrolyte 20 in the negative electrode 14 chamber, which saves on material costs and enhances volumetric utilization. In addition, this configuration yields a broader selection of materials for the negative electrode 14 chamber and the bipolar faradaic membrane 18 by having the alloying negative electrode 14 act as a sacrificial anode against potential $Pb^{2+}$ corrosion. Alternative chemistries may be used because all cations with a lower displacement potential than that of Li in the Li—Pb alloy may be effectively blocked. For example, for an electrochemical cell 10 having a LiPb negative electrode 14, a non-exhaustive list includes $Pb^{2+}$, $Bi^{3+}$, $Zn^{2+}$, $Sn^{2+}$, $Al^{3+}$ ions that can be reduced to their corresponding metal by the Li—Pb alloy.

The bipolar faradaic membrane 18 may include a collection of conductive particles that, at operating temperature, self-settle by density to form a malleable porous layer, e.g., TiN, ZrN, $TiB_2$, graphite, graphene, carbon nanotubes, metals (e.g., Cu, Ti, Fe, Ni, W, Ta, Mo, Si). The bipolar faradaic membrane 18 may include a sintered collection of particles that form a solid porous structure, e.g., TiN, ZrN, $TiB_2$, graphite, metals (e.g., Cu, Ti, Fe, Ni, W, Ta, Mo) plus sintering additives (e.g., MgO, AlN, SiN, $Al_2O_3$, $SiO_2$). The bipolar faradaic membrane 18 may include a composite matrix of insulating (e.g., MgO, $Al_2O_3$, $SiO_4$ AlN, $Si_3N_4$) and conductive particles. For operation at sufficiently low temperature, the insulator could include polymeric materials. The bipolar faradaic membrane 18 may include a porous metallic structure, such as Ni—Fe foam, copper foam, carbon foam, metal felts, perforated material, metallic fibers (e.g., Cu, Ti, Fe, Ni, W, Ta, Mo), steels or alloys thereof. The bipolar faradaic membrane 18 may include a composite architecture of porous media with a distinct conductive upper and lower surface and electronic pathway across the bipolar faradaic membrane 18, e.g., MgO, BN, AlN, SiN, with the electronic pathway made of, e.g., Fe, steel, graphite.

The range of metal available makes for a mechanically robust bipolar faradaic membrane 18 especially when compared to the prior art thin ceramics, like beta-alumina. The bipolar faradaic membrane 18 is an inexpensive and simple to manufacture component, mechanically robust, scalable, functional at any temperature, and operative with any itinerant ion (e.g., Na, Li, Mg, Ca).

The bipolar faradaic membrane 18 may be configured to balance the solubility/rate of diffusion of the positive salt ions, the ionic conductivity through the bipolar faradaic membrane's pores and the solubility/rate of diffusion of the negative electrode ions in the electrolyte 20. For example, the physical properties (e.g., thickness, electronic conductance, effective porosity) and the materials used for the bipolar faradaic membrane 18 may be tailored for a particular cell chemistry, cell configuration, and cell operating conditions to achieve the desired balance.

Referring again to FIGS. 1 and 2, the negative electrode 14, positive electrode 16, electrolyte 20 (both 20a and 20b), and bipolar faradaic membrane 18 are confined in a container 22, which preferably includes a lid 26. The cell container 22 and lid 26 may be made of a conductive metal (e.g., mild steel, stainless steel, graphite) or a conductive metal coated with a thin ceramic (e.g., oxide, nitride, carbide). An electronically conductive structure 62 may be suspended from the lid 26 of the container 22 and may serve as a negative current collector 27. The lid 26 confines the molten constituents and vapors within the container 22. An electrically insulating seal 64 (shown in FIGS. 3A-3C), e.g., made of boron nitride, alumina, magnesia, and aluminum nitride, may electrically isolate the conductive structure 62 from the lid 26. The container 22 and lid 26 may be formed from materials having the requisite electrical conductivity (when so required), mechanical strength, and resistance to chemical attack by the materials that form the electrodes 14 and 16 and electrolyte 20.

One portion 62a of the structure 62 may hold the negative electrode 14 away from the walls of the container 22, obviating the need for an insulating sheath along the walls, and another portion 62b of the structure 62 may extend outside of the lid 26 and serve as the negative terminal 28. The portion 62a that holds the negative electrode 14 may be in the shape of one or more rods (as shown in FIG. 1), an inverted cup, a tube (as shown in FIG. 2) or a mesh. The mesh may be composed of strands on the order of 0.1 to 1 mm in diameter, with similar spacing, although other dimensions may also be used.

Alternatively, or in addition, the portion 62a that holds the negative electrode 14 may be a porous material, e.g., foam or sponge, that holds the negative electrode within the porous material. The porous container may be able to suspend the liquid metal negative electrode 14 without permeation of the metal. The porosity allows electrolyte 20 contact and hence itinerant ion (e.g. $Li^+$) and salt anion (e.g. $Cl^-$) conductivity. The porous container is preferentially wetted by the molten salt electrolyte 20. The conductive bipolar faradaic membrane 18 composition and porosity are tailored in such a way that the alloy anode 14 is not soaked into the bipolar faradaic membrane 18 while still maintaining direct contact.

Depending on the composition of the negative electrode 14, the structure 62 may be made of, e.g., iron or its alloys, carbon or its alloys, such as graphite, mild steel, or a steel alloy containing, for example, nickel and/or chromium. For example, the negative current collector 27 may include a conductive porous foam or mesh 62a (not shown), e.g., iron, iron alloys, connected to a rod 62b. The electronically conductive structure 62 is preferably configured so that some of the liquid or partially liquid negative electrode 14 remains between or within the portion 62a during the charge and discharge cycles, as discussed in more detail below. Surface tension may maintain the negative electrode 14 in place around the portion 62a of the electronically conductive structure 62, such as shown in FIG. 1, or the negative electrode 14 may be held within the portion 62a of the electronically conductive structure 62, such as shown in FIG. 2.

A portion of the container 22 in contact with the positive electrode 16 functions as a positive current collector 23, through which electrons may pass to an external source or load by way of a positive terminal (discussed in FIGS. 3A-3C below) connected to the container 22. The negative terminal 28 and the positive terminal may be oriented to facilitate arranging individual cell units in series by connecting the negative terminal 28 of one cell unit to the positive terminal of another cell unit 10 to form a battery or electrochemical cell. Alternatively, the negative terminals 28 may be connected to one another, and the positive terminals may be connected to one another to arrange the cells in parallel.

Alternatively, the interior surface of the container 22 may include an insulating inner sheath (not shown). The sheath may prevent shorting by electronic conduction between the negative electrode 14 and the positive electrode 16 through the container 22 when the container is made of electronically conductive material and an electronically conductive structure 62 is not used to hold the negative electrode 14 away from the walls of the container 22. The sheath may be formed from an electrically insulating material and should be corrosion-resistant against the electrodes 14 and 16 and the electrolyte 20. For example, boron nitride, aluminum nitride, alumina, and/or magnesia are appropriate materials for the sheath and seal 64 (shown in FIGS. 3A-3C), although other materials, such as high temperature resistant polymers, like poly(oxyethylene) methacrylate-g-poly(dimethyl siloxane) (POEM-g-PDMS), also may be used.

The electrochemical cell 10 also may have an inert gas layer 32 overlaying the negative electrode 14 and the portion 62a of the electrically conductive structure 62 in order to accommodate global volume changes in the cell system produced by charging and discharging, or temperature changes. Optionally, the lid 26 or seal 64 may incorporate a safety pressure valve (not shown) in order to regulate changes in pressure within the electrochemical cell 10.

During operation of the electrochemical cell 10 shown in FIG. 2, the ratio of active metal cations in the electrolyte 20 varies. The composition of the electrolyte 20 changes from one where the first active metal salt $AX_n$ is predominant (discharged state) to a composition where the second active metal salt $BX_m$ is predominant (charged state). Changes in the salt composition of the electrolyte 20 are controlled by the following reactions occurring simultaneously at the electrode-bipolar faradaic membrane interface 42 and the electrode-electrolyte interface 46:

Anode/bipolar faradaic membrane: $mA \leftrightarrows m(A^{n+}+ne^-)$
Electrolyte/catholyte: $mA^{n+}+n(BX_m) \leftrightarrow m(AX_n)+nB^{m+}$
Catholyte/cathode: $n(B^{m+}+me^-) \leftrightarrow nB$ Numerous factors are important when choosing additional elements for the electrodes 14, 16. For example, those factors include, among other things, the chemical equilibrium and solution thermodynamics in the electrodes, their interactions with the electrolyte, their relative densities, melting points and boiling points.

The illustrative electrochemical cell 10 receives or delivers energy by transporting metals, such as the first active metal from the anode 14 into the electrolyte 20 and the second active metal from the electrolyte 20 into the cathode 16 upon charging and vice versa upon discharging. The liquid electrolyte 20, comprising cations of both active metals, enables ionic transport of the active metals from the electrodes 14, 16 into the electrolyte 20 and vice versa. The bipolar faradaic membrane 18 prevents the cation of the second active metal from contacting the first active metal electrode 14.

Figures 3A, 3B, 3C:
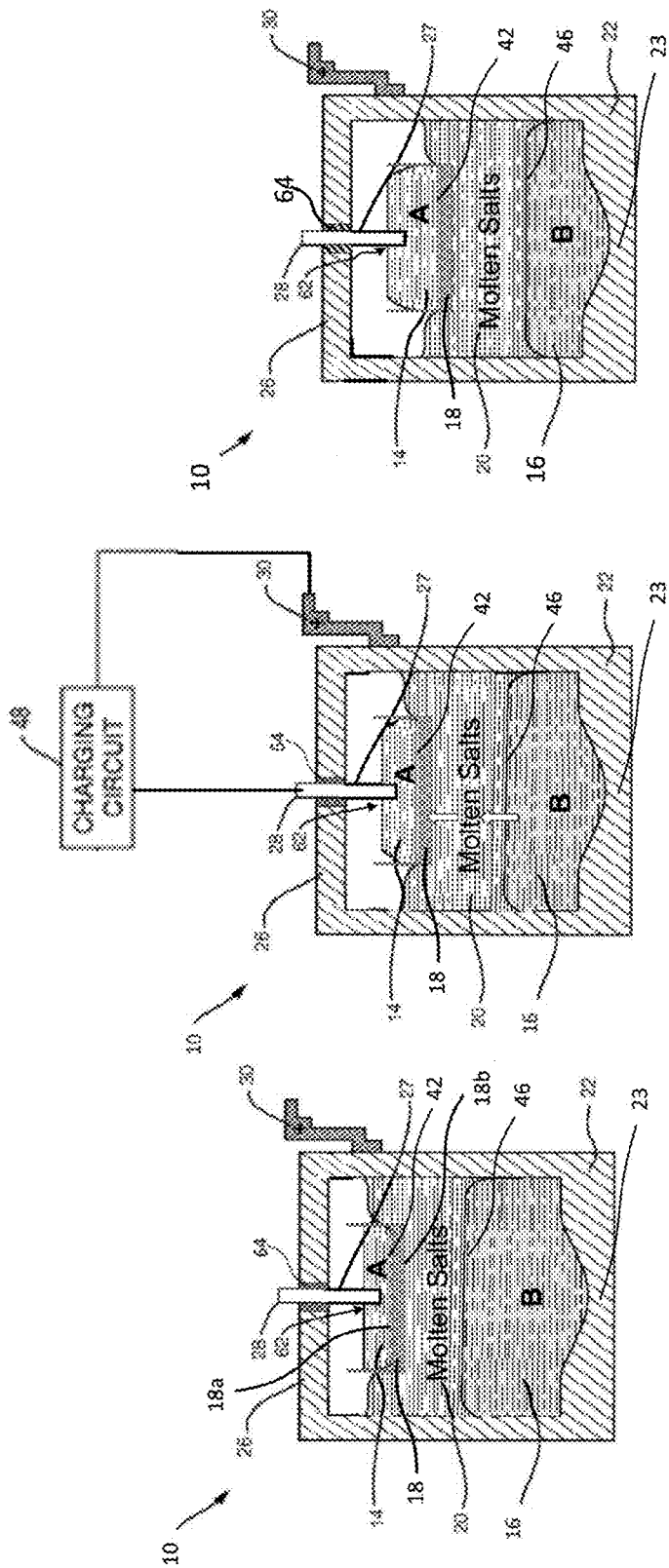
FIGS. 3A-3C are vertical cross-sectional views illustrating the charging process of an electrochemical cell with a bipolar faradaic membrane, such as shown in FIG. 2, according to embodiments of the present invention.

FIGS. 3A-3C show the charging process for the electrochemical cell 10, such as shown in FIG. 2, according to embodiments of the present invention. FIG. 3A shows the cell 10 in an uncharged or discharged state. The positive electrode 16 may be in a liquid phase, such as shown in FIG. 3A, or may include liquid and solid phases. Before charging, the electrolyte 20 contains cations of the active anodic metal $A^{n+}$ or of both the active metals $A^{n+}$ and $B^{m+}$ (e.g., a molar amount of the cations of the first active metal $A^{n+}$ may be greater than the molar amount of the cations of the second active metal $B^{m+}$). For example, the parts of these cations as expressed by $A^{n-}:B^{m+}$ may initially be from about 1M:1 to about 1:100. The bipolar faradaic membrane 18 meets the electrolyte 20 at the negative electrode/bipolar faradaic membrane interface 42. In a corresponding manner, the positive electrode 16 meets the electrolyte 20 at a separate positive electrode/electrolyte interface 46. As shown and discussed below, these interfaces move during charging and discharging, and the volumes of the negative electrode 14 and positive electrode 16 increase or decrease at the expense of one another.

Specifically, FIG. 3B shows the effect of the charging process on the components of the electrochemical cell 10. To initiate charging, the terminals 28 and 30 are connected to an external charging circuit 48, which drives the active metal salt $A^{n+}$, which is converted into the active metal A at the negative electrode/bipolar faradaic membrane interface 42. The active cations and the electrons meet at the interface 42 and are consumed in the reduction half-cell reaction $mA^{n+}+mne^- \rightarrow mA$. During charging, electron current travels from the external circuit, through the negative current collector 27, into the negative electrode 14, and to the negative electrode/bipolar faradaic membrane interface 42. The neutral active metal atoms A created in the half-cell reaction accrue to the negative electrode 14. As the active metal A accumulates in the negative electrode 14, the negative electrode/bipolar faradaic membrane interface 42 moves further away from the negative current collector 27 as the negative electrode 14 grows thicker. Meanwhile, the active metal B is driven from the positive electrode 16, into the electrolyte 20, as a cation $B^{m+}$ at the positive electrode/electrolyte interface 46. At the positive electrode/electrolyte interface 46, atoms of the active metal B in the positive electrode 16 are oxidized in the half-cell reaction $nB \rightarrow nB^{m+}+nme^-$. As active cations $B^{m+}$ enter the electrolyte 20, electrons are freed to pass through the positive current collector 23 to the external charging circuit 48. Oxidation of the active metal atoms B shrinks the positive electrode 16, and the electrolyte interface 46 moves toward the positive current collector 23.

The active metal deposited in the negative electrode 14 represents stored electrical energy which may persist substantially indefinitely, as long as no external electrical path joins the two electrodes 14 and 16 and the recombination of cathodic salt at the negative electrode/bipolar faradaic membrane interface 42 is minimized.

FIG. 3C shows the cell 10 in its final charged state. Charging has changed the composition of at least the electrolyte 20, by loss of atoms of the first active metal salt $A^{n+}$, and increase of the second active metal salt $B^{m+}$. The thickness of the negative electrode 14 has grown at the expense of the positive electrode 16. The electrolyte layer 20 may have changed in volume due to a difference in density between the first and second active metal salts.

The discharge process for the electrochemical cell 10 shown in FIG. 2 is the same as the charging process, but in reverse (e.g., shown by FIGS. 3C through 3A) with FIG. 3B having a load, rather than a power supply, attached to the terminals 28 and 30. The charging process of the electrochemical cell 10 shown in FIG. 1 operates in a similar manner as described in FIGS. 3A-3C except that the active cations $A^{n+}$ and the electrons meet at the interface of the negative electrode 14 and electrolyte 20a and are converted into the active metal A at that interface.

Although the above discussion mentions the top and bottom surfaces or the upper and lower surfaces, embodiments of the electrochemical cell 10 may be formed in any orientation, e.g., with the negative electrode 14 on the top and the positive electrode 16 on the bottom (as shown in FIGS. 1 through 3C), with the negative electrode 14 on the bottom and the positive electrode 16 on the top, or with the negative electrode 14 and positive electrode 16 oriented in a side-by-side configuration. In addition, the bipolar faradaic membrane 18 may be configured to have either surface positively or negatively charged, as long as the positively charged surface is facing the negative electrode 14 and the negatively charged surface is facing the positive electrode 16 so that the electrostatically induced charges drive spontaneous protective charge transfer reactions. Although the above discussion discloses one positive electrode and one negative electrode, one or more positive electrodes 16 and/or one or more negative electrodes 14 may be used.

The compositions of the electrode 14 and 16 and electrolyte 20 may be formulated so that all-liquid operation may be reached at relatively low temperatures, such as about 500° C. or lower, e.g., between about 200° C. to 300° C. Difficulties such as volatilization of cell constituents, structural weakness, chemical attack of ancillary materials, and power required to maintain liquidity of the electrodes 14 and 16 and electrolyte 20 become more manageable as the operating temperature decreases, reducing the cost of operating the cell 10 and extending its service lifetime.

The electrodes 14 and 16 and the electrolyte 20 may be further formulated so that their densities are ordered in accordance with their functions in the electrochemical cell 10. Various embodiments having respective densities increasing or decreasing in the order of negative electrode 14/electrolyte 20/positive electrode 16 may spontaneously self-assemble into the illustrated vertically stacked, layered structure upon melting, providing for simpler manufacture.

The bipolar faradaic membrane 18 allows a manufacturing-focused, cell 10 to be made with demonstrated performance that projects to a full system cost<100$/kWh (cell active material, secondary material, system components and manufacturing process) and a cycle lifetime of a minimum of 10,000 cycles. The embodiments of the electrochemical cell 10 described herein may be used in electrolytic metallurgy, electro refining, metal extraction, and electrochemical filtration.

The electrochemical cell or battery 10 may be capable of rapidly receiving and dispatching electricity, thus bridging a supply-demand mismatch. The electrochemical cells 10 may operate at extreme temperatures, such as arctic cold and desert heat, without restriction on geographical location, and are realizable in a mobile application.

Embodiments of the electrochemical cells 10 thus may achieve high capability while using low-cost, abundant materials. Selection of the first and second active metals, bipolar faradaic membrane 18, and electrolyte 20 in various combinations discussed herein, permits a self-assembling cell and enables low-cost manufacturing.

EXAMPLES

Example 1

Figure 4A:
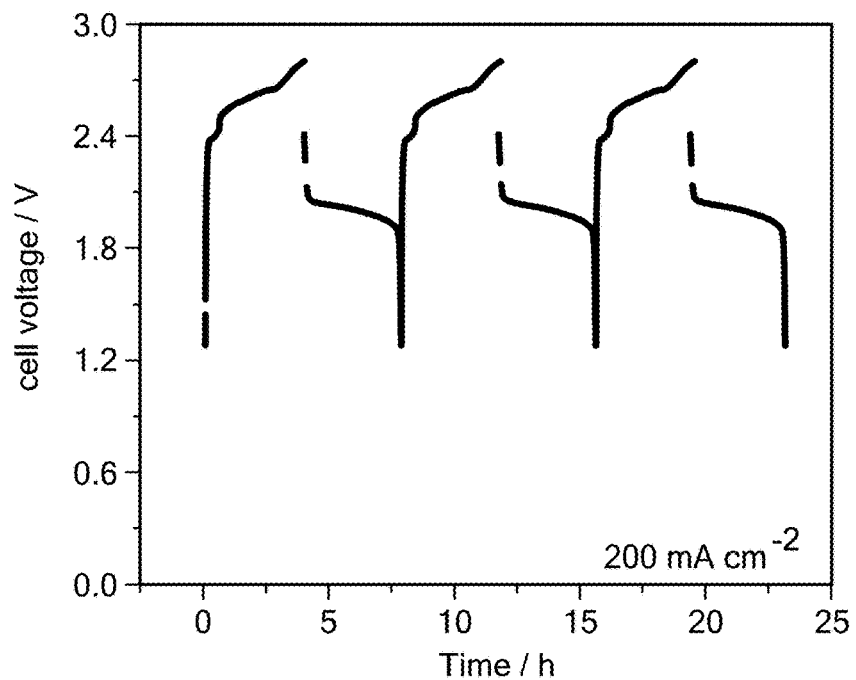
FIG. 4A is a graph of cell voltage as a function of time for a Li/LiCl—KCl/PbCl$_2$ displacement cell having a TiN-1-3 wt % MgO bipolar faradaic membrane operating at 450° C. according to embodiments of the present invention.
Figure 4B:
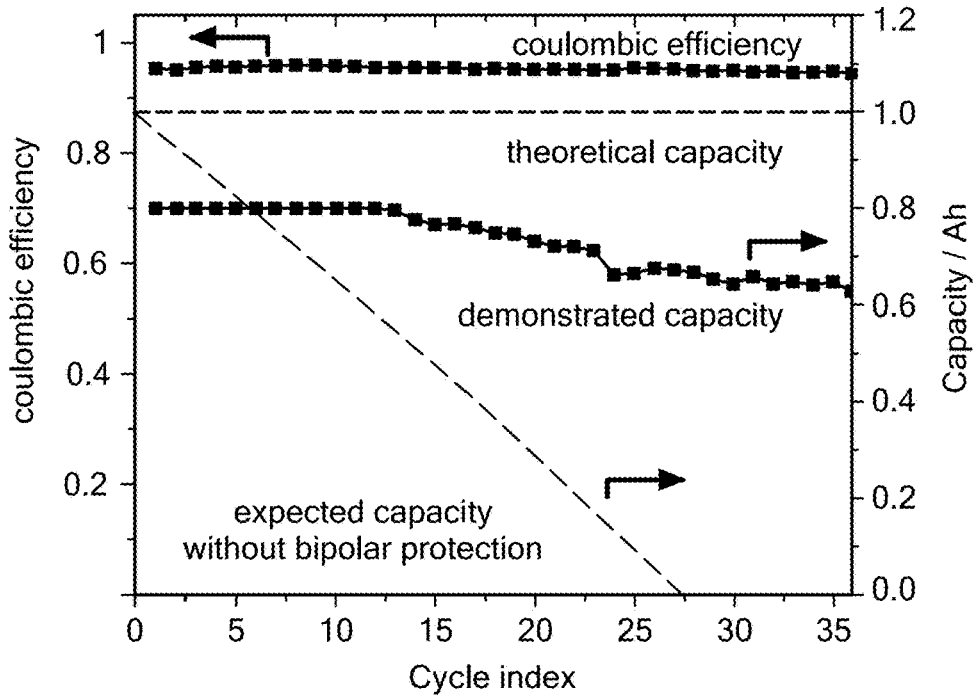
FIG. 4B is a graph of columbic efficiency and capacity as a function of cycle index for this cell comparing columbic efficiency, theoretical capacity, demonstrated capacity, and expected capacity without the bipolar faradaic membrane according to embodiments of the present invention.

A Li/LiCl—KCl/PbCl$_2$ displacement cell was assembled with Li as the negative electrode, Pb as the positive electrode, and LiCl—KCl as the electrolyte. The cell included a bipolar porous faradaic membrane, such as shown in FIG. 1. The bipolar faradaic membrane was composed of electronically conductive titanium nitride with 1-2 wt % MgO sintering additive, having a thickness of 3-5 mm. The powdered mixture was sintered at 1100° C. overnight in a graphite crucible that had communication holes in the bottom (about 10 microns in diameter) to allow electrolyte salt permeation. As shown in FIG. 4A, 30 charge/discharge cycles at an operating temperature of 450° C. and a high current density of 200 mA/cm$^2$ consistently achieved 70% energy efficiency. FIG. 4B shows the corresponding discharge capacity as a function of cycle index. A cell without the bipolar faradaic membrane protection suffers from limited coulombic efficiency corresponding to the irreversible loss of capacity via direct contact of Pb$^{2+}$ with the Li negative electrode. The expected capacity from a cell without a bipolar faradaic membrane would rapidly fade (as indicated by the dashed line in FIG. 4B and calculated from the observed coulombic efficiency). Instead, the demonstrated capacity showed a much-reduced capacity fade. In addition, Pb droplets were observed to form at the bottom surface of the bipolar faradaic membrane, evidence of the effectiveness of the bipolar faradaic membrane protective charge transfer. While the capacity fade observed (0.2%/cycle) was too high for a long lifetime cell, the mechanism can be optimized to suppress irreversible capacity fade while maximizing round-trip efficiency by tailoring the physical properties (e.g., thickness, electronic conductance, effective porosity) and the materials used for the bipolar faradaic membrane.

Example 2

A Li—Pb/LiCl—KCl/PbCl$_2$ displacement cell was assembled with Li—Pb as the negative electrode, Pb as the positive electrode, and LiCl—KCl as the electrolyte. The cell included a bipolar faradaic membrane directly adjacent to the negative electrode, such as shown in FIG. 2. The negative electrode and bipolar faradaic membrane were contained in an electrically conductive container made of a graphite tube. The tube had one-end sealed with 6 g of electronically conductive titanium nitride with 1-2 wt % MgO sintering additive to form the bipolar faradaic membrane. The sintered TiN bottom had pores (about 10 microns in diameter) to allow electrolyte salt permeation but held, and was impermeable to, the liquid negative electrode alloy.

Figure 5:
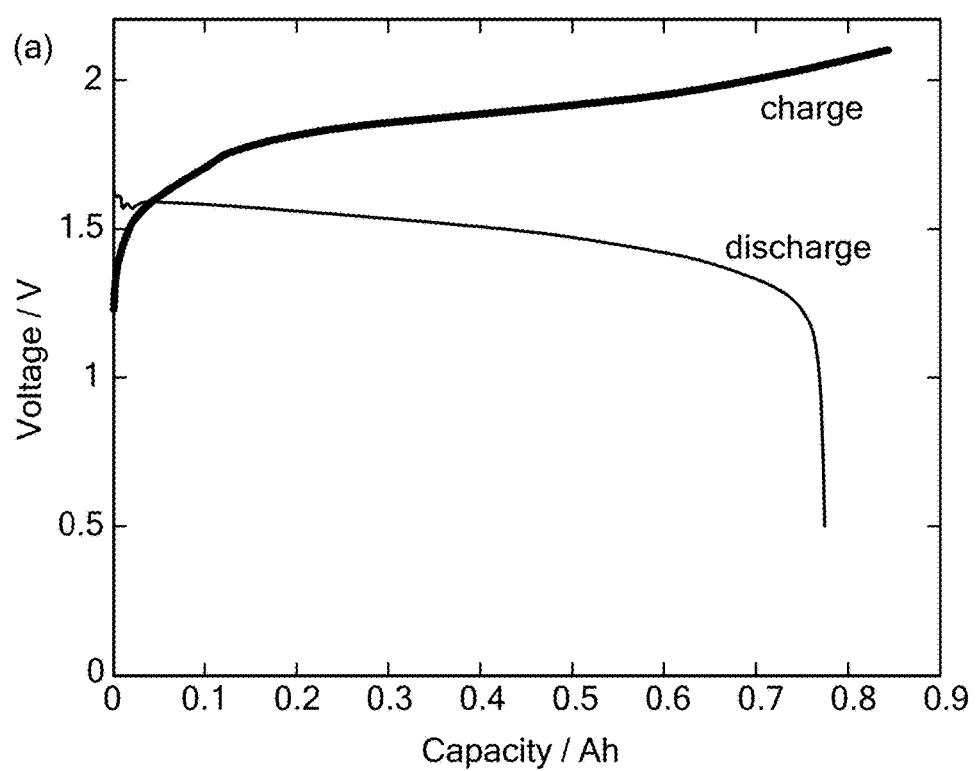
FIG. 5 is a graph of cell voltage as a function of capacity for a Li—Pb/LiCl—KCl/PbCl$_2$ displacement cell having an electronically conductive titanium nitride bipolar faradaic membrane with 1-2 wt % MgO sintering additive operating at 410° C. according to embodiments of the present invention.

FIG. 5 shows the charge-discharge profiles at an operating temperature of 410° C. having a nominal discharge voltage of about 1.4 V, which is nearly two times that of a prior art liquid metal battery with alloying Li//Pb—Sb cell and 0.4 V lower than the Li//PbCl$_2$ displacement cell with bipolar faradaic membrane of Example 1. Although the cell voltage is slightly lower than that of a Li//PbCl$_2$ chemistry, the use of a negative electrode alloy allows for lower operating temperatures without wetting issues (e.g., apparent in the pure Li negative electrode chemistry). The negative electrode alloy, instead of pure Li or Na, lowers the corrosion constraints on secondary components such as seals. After 50 cycles, the negative electrode was removed from the cell, and Pb droplets were observed at the bottom of the porous container. As the density of Pb was higher than that of the electrolyte, Pb continuously dropped back to the positive electrode side, maintaining the cell capacity.

Figure 6:
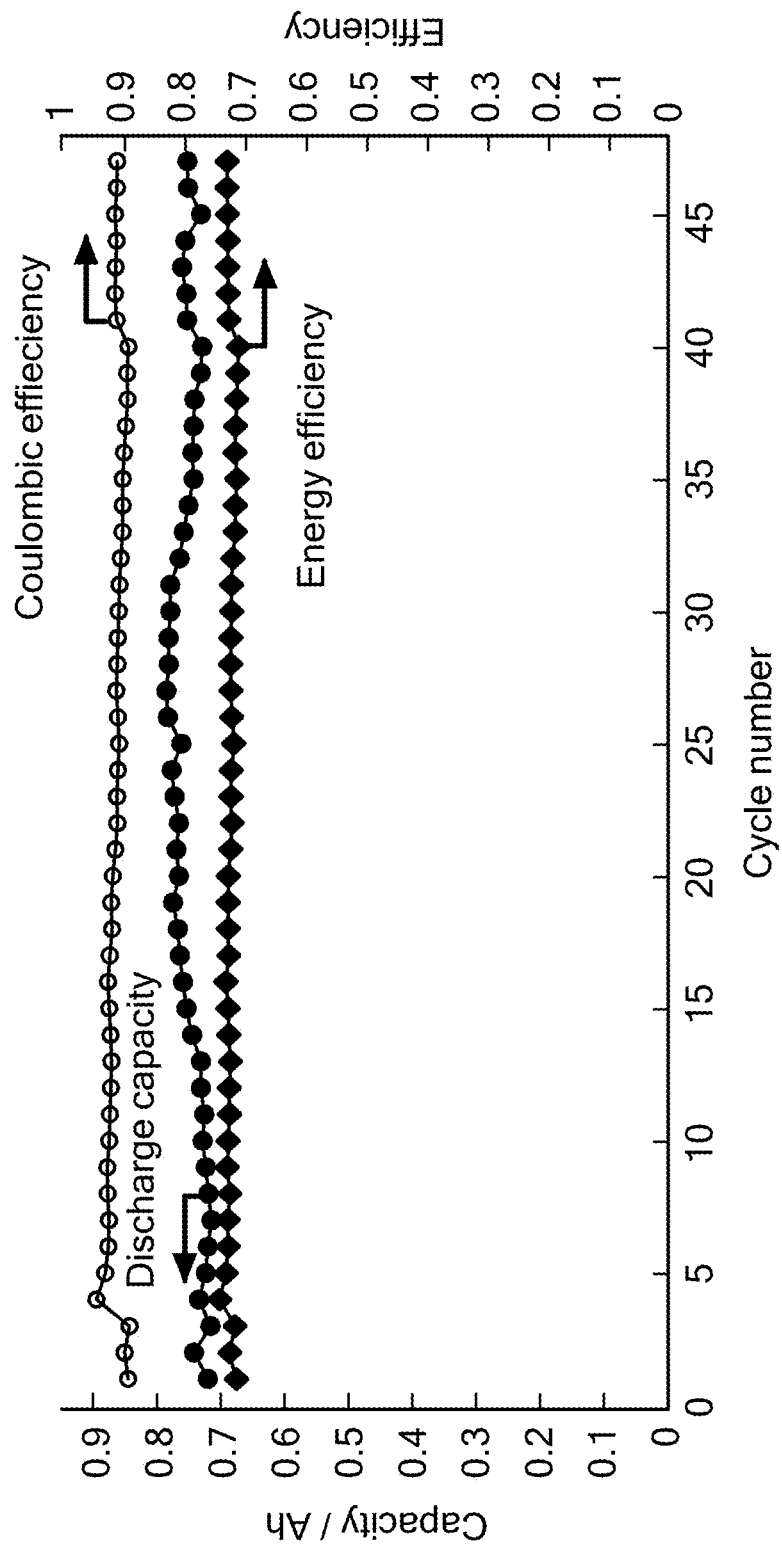
FIG. 6 is a graph of discharge capacity, energy efficiency and coulombic efficiency as a function of cycle number for a Li—Pb/LiCl—KCl/PbCl$_2$ cell having an electronically conductive titanium nitride bipolar faradaic membrane with 1-2 wt % MgO sintering additive operating at 405° C. and a charge current density of 200 mA/cm$^2$ and discharge current density of 100 mA/cm$^2$ according to embodiments of the present invention.

FIG. 6 shows that 50 charge/discharge cycles at a high current density of above 100 mA/cm$^2$ was achieved. The cell demonstrated coulombic efficiency higher than 90% and energy efficiency higher than 70%. Importantly, no capacity fade was observed after 50 cycles. Some Pb was consumed and stayed at the bottom of the porous negative electrode. As the amount of Pb at the bottom of the negative electrode was saturated, the Pb began to drop back, keeping the Pb in the positive electrode constant.

Example 3

Figure 7:
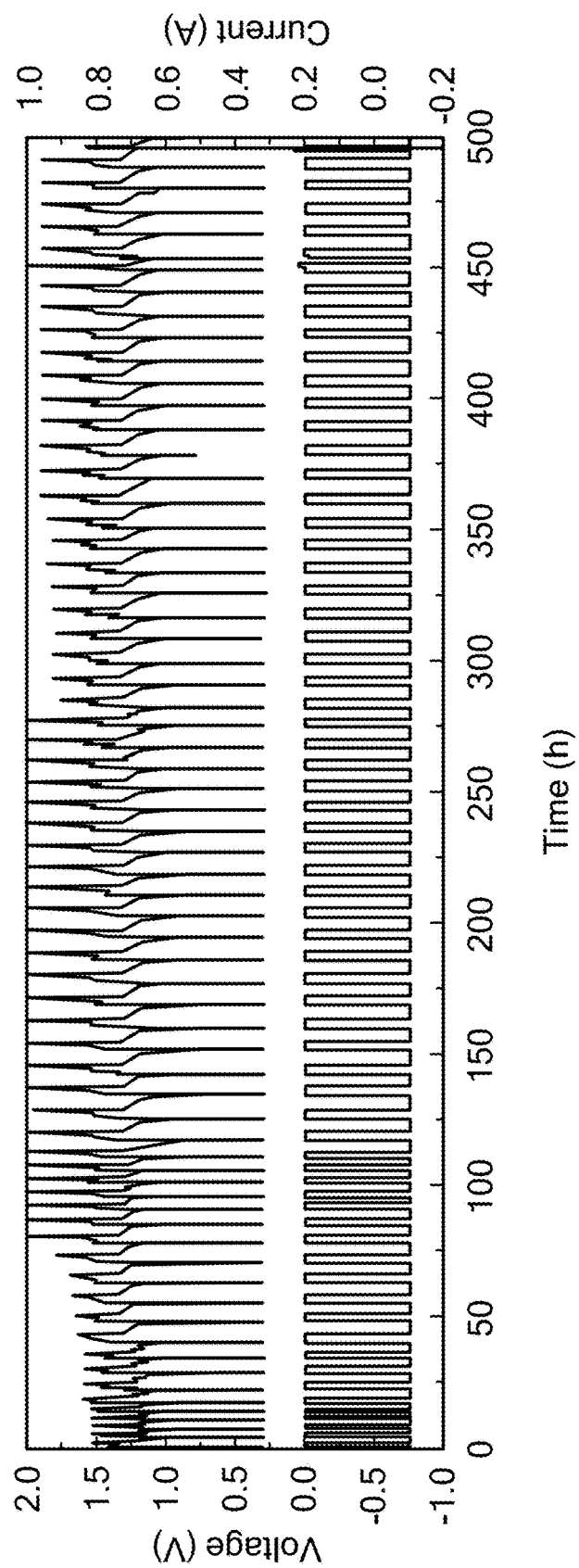
FIG. 7 is a graph of voltage and current as a function of time for a Li—Bi/LiCl—KCl/PbCl$_2$ cell having an electronically conductive titanium nitride bipolar faradaic membrane with 1-2 wt % MgO sintering additive operating at 405° C. according to embodiments of the present invention.

In order to further demonstrate that the configuration was effective at preventing $Pb^{2+}$ permeation, a cell of Li—Bi/LiCl—KCl/$PbCl_2$ chemistry was assembled to allow for Pb permeation chemical analysis. In this cell, Bi was contained in the porous container as a negative electrode, Pb was employed as the positive electrode, and the LiCl—KCl as the electrolyte. The cell included an electronically conductive titanium nitride faradaic membrane with 1-2 wt % MgO sintering additive (formed according to Example 2) between the Li—Bi negative electrode and the LiCl—KCl electrolyte, such as shown in FIG. 2. After continuous charge-discharge cycles for a week, no Pb was detected by EDS under the detection limits, confirming that the bipolar faradaic membrane with a negative electrode alloy is capable of effectively blocking $Pb^{2+}$. FIG. 7 shows voltage- and current-profiles at an operating temperature of 405° C. As shown, the nominal cell voltage was 1.2V, corresponding to the potential difference of Li—Bi and $PbCl_2$. The cell was cycled for more than 500 h with coulombic efficiency higher than 92% and energy efficiency higher than 70%. The Li—Bi//$PbCl_2$ chemistry confirms the versatility of this cell design.

Example 4

Figure 8:
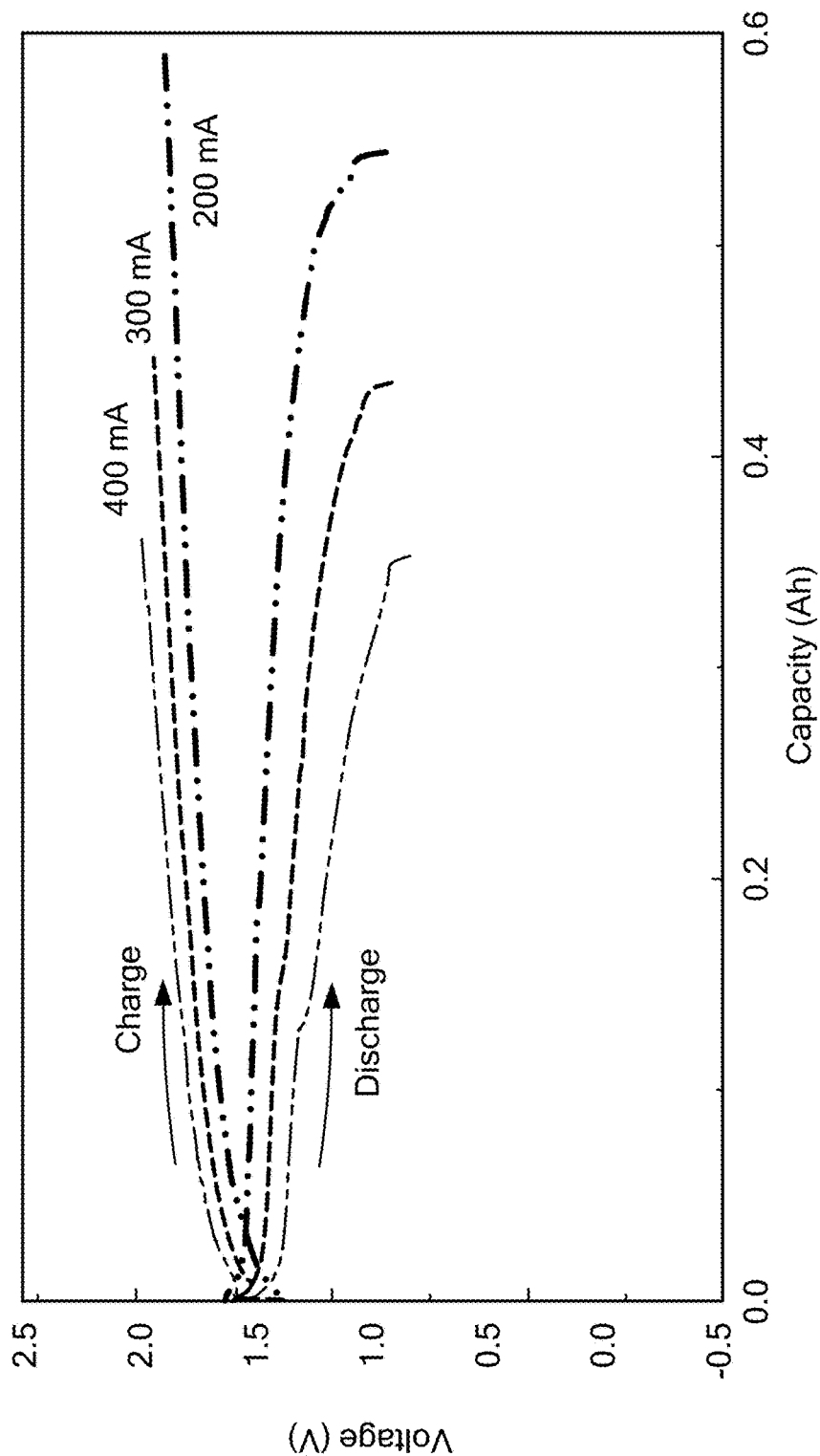
FIG. 8 is a graph of voltage as a function of capacity for a LiPb/LiCl—KCl/SnCl$_2$ cell having an electronically conductive titanium nitride bipolar faradaic membrane with 1-2 wt % MgO sintering additive operating at 400° C. at various current densities according to embodiments of the present invention.

A LiPb/LiCl—KCl/$SnCl_2$ displacement cell was assembled with Li—Pb as the negative electrode, tin (Sn) as the positive electrode, and LiCl—KCl as the electrolyte. The cell included an electronically conductive titanium nitride faradaic membrane with 1-2 wt % MgO sintering additive (formed according to Example 2) between the Li—Pb negative electrode and the LiCl—KCl electrolyte, such as shown in FIG. 2. FIG. 8 shows voltage profiles at various current densities at an operating temperature of 400° C. As shown, the cell was cycled at various current densities ranging from 200 to 400 $mA/cm^2$, and the cell had a coulombic efficiency higher than 90%.

Example 5

Figure 9:
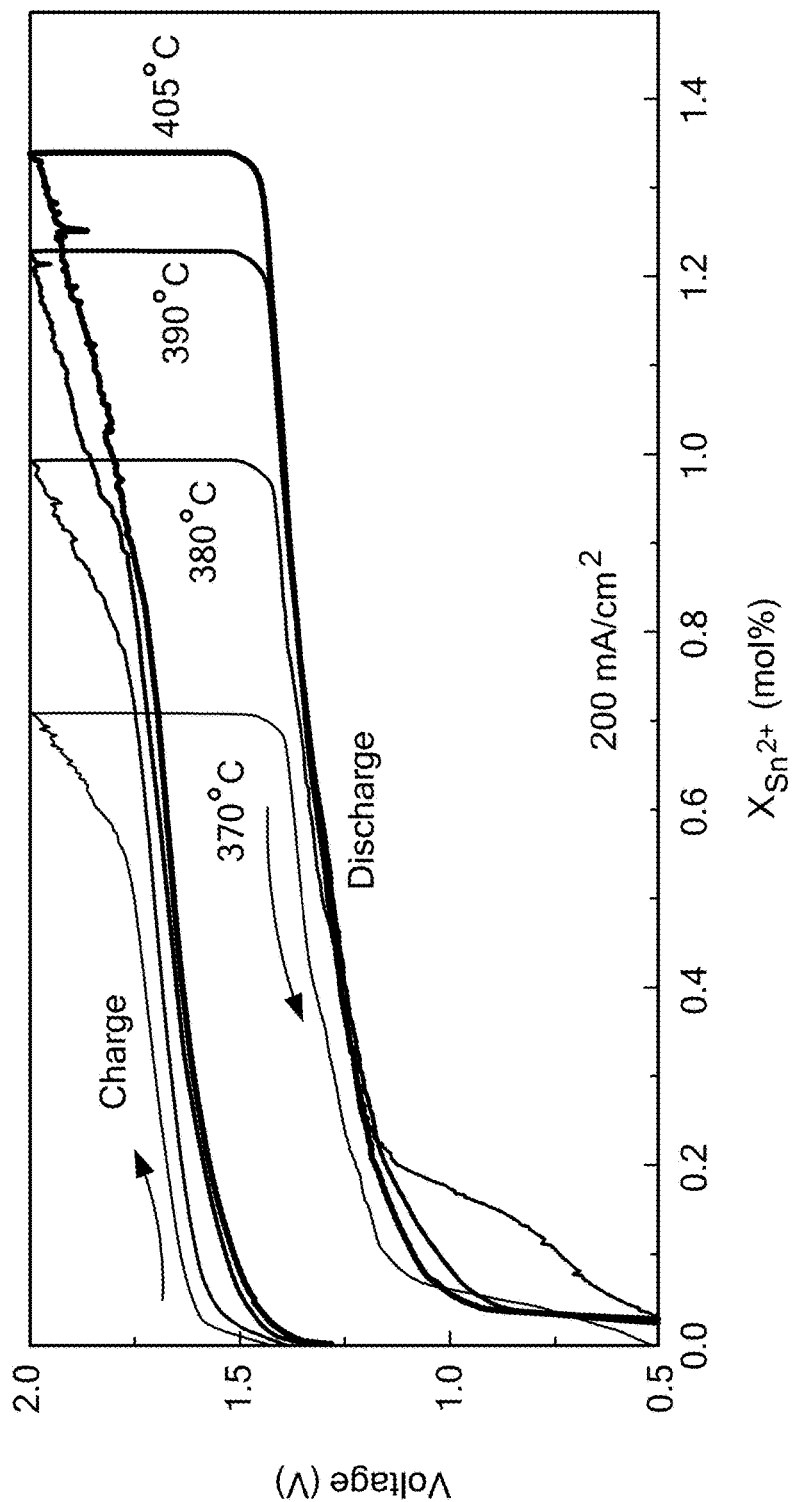
FIG. 9 is a graph of voltage as a function of the mole % of tin for a Li—Sn/LiCl—KCl/SnCl$_2$ cell having an electronically conductive titanium nitride bipolar faradaic membrane with 1-2 wt % MgO sintering additive at various operating temperatures ranging from 370-405° C. according to embodiments of the present invention.

A LiSn/LiCl—KCl/$SnCl_2$ cell was assembled with Li—Sn as the negative electrode, Sn as the positive electrode, and LiCl—KCl as the electrolyte. The cell included an electronically conductive titanium nitride faradaic membrane with 1-2 wt % MgO sintering additive (formed according to Example 2) between the LiSn negative electrode and the LiCl—KCl electrolyte, such as shown in FIG. 2. FIG. 9 shows voltage profiles at various operating temperatures ranging from 370-405° C. Tin (Sn) and its halides salts ($SnCl_2$ and $SnBr_2$) have a low melting temperature, and the Li—Sn||$SnCl_2$ chemistry worked at various temperature ranges with a high round-trip efficiency.

Example 6

Figure 10:
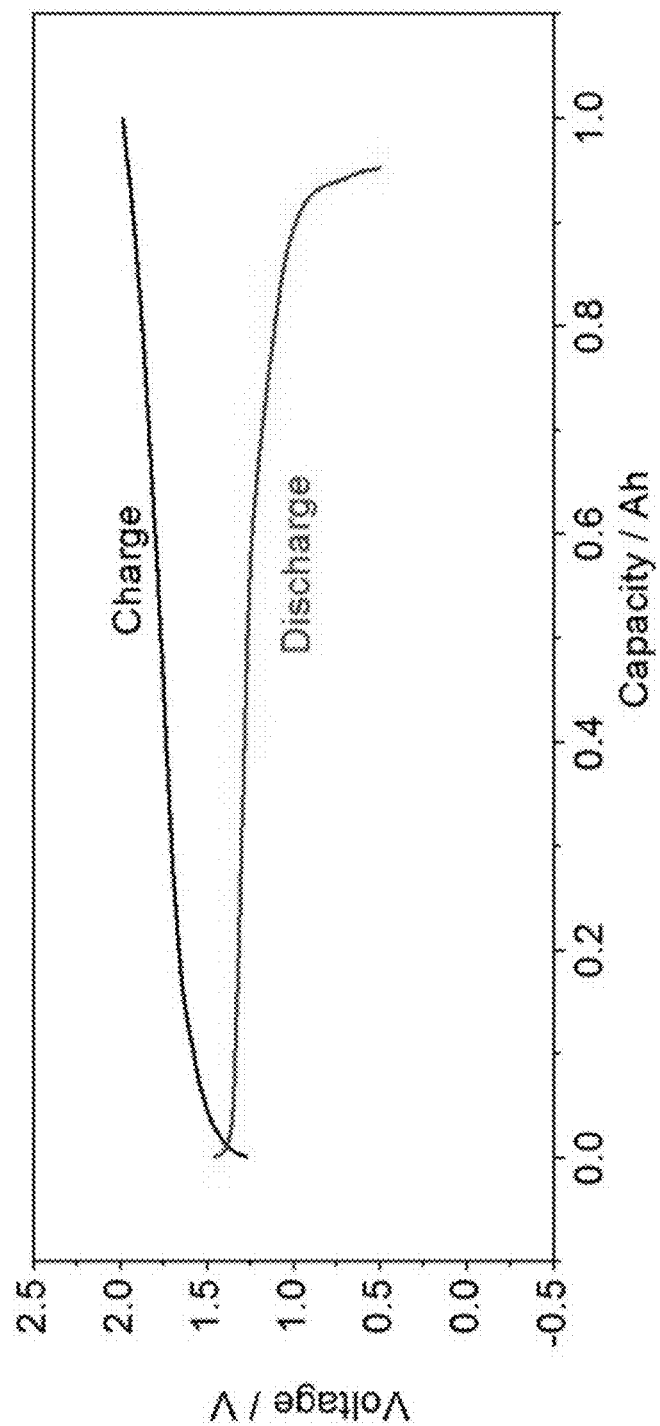
FIG. 10 is a graph of voltage as a function of capacity for a LiPb/LiBr—KBr/PbBr$_2$ cell having an electronically conductive titanium nitride bipolar faradaic membrane with 1-2 wt % MgO sintering additive operating at 370° C. according to embodiments of the present invention.

A LiPb/LiBr—KBr/$PbBr_2$ displacement cell was assembled with Li—Pb as the negative electrode, Pb as the positive electrode, and LiBr—KBr as the electrolyte. The cell included an electronically conductive titanium nitride faradaic membrane with 1-2 wt % MgO sintering additive (formed according to Example 2) between the Li—Pb negative electrode and the bromide electrolyte, such as shown in FIG. 2. The $PbBr_2$ and bromide based molten salts have lower melting point allowing the cell to operate at a lower temperature. FIG. 10 shows the charge-discharge profiles at an operating temperature of 370° C. As shown, the Li—Pb//$PbBr_2$ cell had a coulombic efficiency of 95% at 1 Ah scale. The nominal discharge cell voltage was 1.2V at 200 $mA/cm^2$.

Example 7

Figure 11:
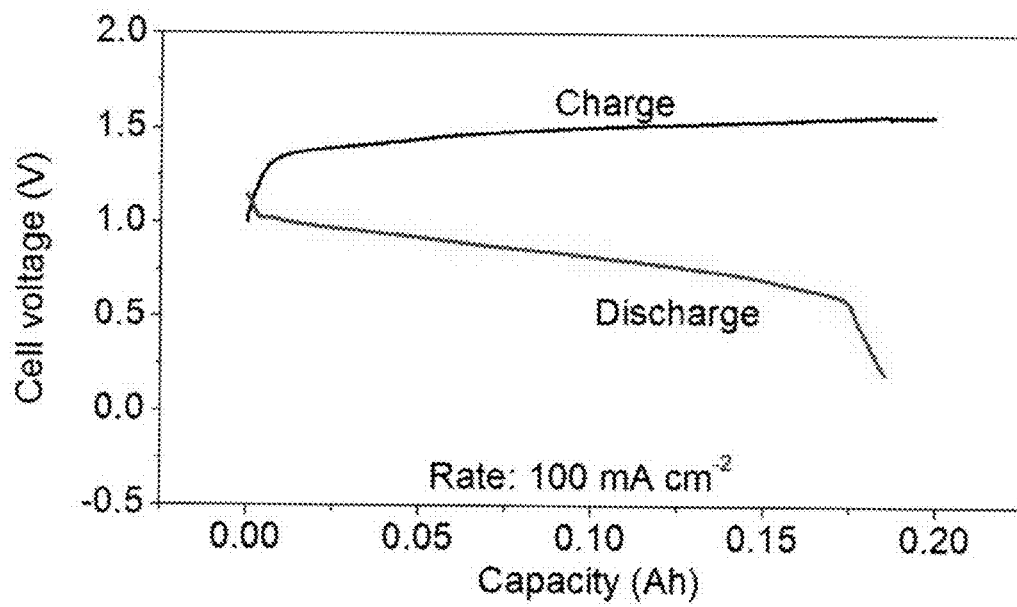
FIG. 11 is a graph of voltage as a function of capacity for a Mg—Pb/MgCl$_2$—NaCl—KCl/PbCl$_2$ cell having an electronically conductive titanium nitride bipolar faradaic membrane with 1-2 wt % MgO sintering additive operating at 420° C. according to embodiments of the present invention.

A Mg—Pb/$MgCl_2$—NaCl—KCl/$PbCl_2$ displacement cell was assembled with Mg—Pb as the negative electrode, Pb as the positive electrode, and $MgCl_2$—NaCl—KCl as the electrolyte. The cell included an electronically conductive titanium nitride faradaic membrane with 1-2 wt % MgO sintering additive (formed according to Example 2) between the Mg—Pb negative electrode and the $MgCl_2$—NaCl—KCl electrolyte, such as shown in FIG. 2. FIG. 11 shows the charge-discharge profiles at an operating temperature of 420° C. As shown, this cell had a coulombic efficiency of 90% and good cyclability.

Example 8

Figure 12:
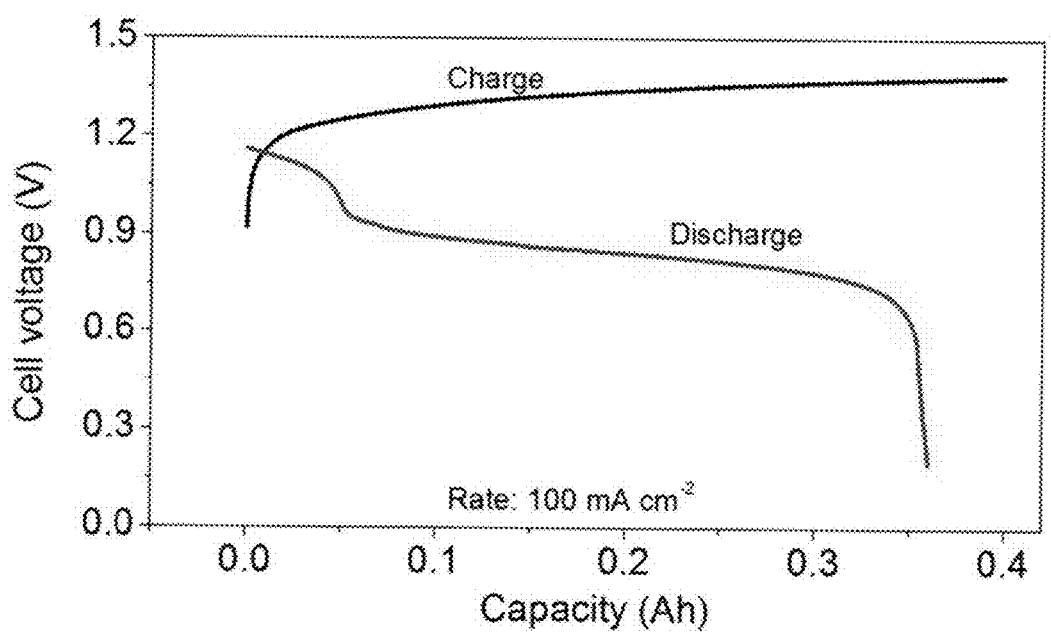
FIG. 12 is a graph of voltage as a function of capacity for a Mg—Sn/MgCl$_2$—NaCl—KCl/PbCl$_2$ cell having an electronically conductive titanium nitride bipolar faradaic membrane with 1-2 wt % MgO sintering additive operating at 420° C. according to embodiments of the present invention.

A Mg—Sn/$MgCl_2$—NaCl—KCl/$PbCl_2$ displacement cell was assembled with Mg—Sn as the negative electrode, Pb as the positive electrode, and $MgCl_2$—NaCl—KCl as the electrolyte. The cell included an electronically conductive titanium nitride faradaic membrane with 1-2 wt % MgO sintering additive (formed according to Example 2) between the Mg—Sn negative electrode and the $MgCl_2$—NaCl—KCl electrolyte, such as shown in FIG. 2. FIG. 12 shows the charge-discharge profiles at an operating temperature of 420° C. As shown, this cell had a coulombic efficiency of 90% and good cyclability.

Although the above discussion discloses various exemplary embodiments of the invention, it should be apparent that those skilled in the art may make various modifications that will achieve some of the advantages of the embodiments without departing from the true scope of the invention.

What is claimed is:

1. An electrochemical cell comprising:
   a negative electrode comprising a first liquid phase having a first active metal;
   a positive electrode, separated from the negative electrode, comprising a second liquid phase having a second active metal;
   a liquid electrolyte, disposed between the negative electrode and the positive electrode, comprising a salt of the first active metal and a salt of the second active metal; and
   a bipolar faradaic membrane, disposed between the negative electrode and the positive electrode, having a first surface facing the negative electrode and a second surface facing the positive electrode, the bipolar faradaic membrane is porous so as to allow cations of the first active metal to pass through and configured to impede cations of the second active metal from transferring from the positive electrode to the negative electrode, the bipolar faradaic membrane at least partially formed from a material having an electronic conductivity, at an operating temperature of the electrochemical cell, sufficient to drive faradaic reactions at the second surface with the cations of the positive electrode such that a rate of oxidation of the first active metal at the first surface is equal to or greater than a rate of reduction of the cations of the positive electrode at the second surface which causes the cations of the second active metal to be impeded from transferring from the positive electrode to the negative electrode, the operating temperature of the electrochemical cell is in the range of 500° C. or lower.

2. The electrochemical cell according to claim 1, wherein the bipolar faradaic membrane is configured to have the first surface positively charged and the second surface negatively charged.

3. The electrochemical cell according to claim 2, wherein the positively charged first surface and the negatively charged second surface are electrostatically induced.

4. The electrochemical cell according to claim 1, wherein the electronic conductivity of the material is greater than or equal to $10^{-10}$ S/m at the operating temperature of the electrochemical cell.

5. The electrochemical cell according to claim 1, wherein the bipolar faradaic membrane is permeable to passive spectator ions.

6. The electrochemical cell according to claim 1, wherein the bipolar faradaic membrane is selected from the group consisting of titanium nitride, zirconium nitride, titanium diboride, graphite, graphene, metals, metalloids, and combinations thereof.

7. The electrochemical cell according to claim 1, wherein the bipolar faradaic membrane further comprises a sintering additive, wherein the sintering additive is selected from the group consisting of magnesium oxide, aluminum oxide, aluminum nitride, silicon nitride, silicon oxide, silicon oxynitride, and combinations thereof.

8. The electrochemical cell according to claim 1, wherein the bipolar faradaic membrane is an electronically conductive matrix comprising an insulator and conductive particles, wherein the insulator is selected from the group consisting of magnesium oxide, aluminum oxide, silicon oxide, aluminum nitride, silicon nitride, silicon oxynitride, polymers, and combinations thereof.

9. The electrochemical cell according to claim 1, wherein the bipolar faradaic membrane is selected from the group consisting of nickel-iron foam, copper foam, carbon foam, metal felt, metallic fibers, steels, alloys, and combinations thereof.

10. The electrochemical cell according to claim 1, wherein the bipolar faradaic membrane is selected from the group consisting of copper, titanium, iron, nickel, tungsten, tantalum, molybdenum, silicon, and combinations thereof.

11. The electrochemical cell according to claim 1, wherein the bipolar faradaic membrane further comprises an electronic pathway across the bipolar faradaic membrane, wherein the electronic pathway is selected from the group consisting of iron, steel, graphite, graphene, and combinations thereof.

12. The electrochemical cell according to claim 1, wherein the negative electrode is selected from the group consisting of sodium, lithium, magnesium, calcium, and combinations thereof.

13. The electrochemical cell according to claim 1, wherein the positive electrode is selected from the group consisting of lead, zinc, tin, bismuth, antimony, and combinations thereof.

14. The electrochemical cell according to claim 1, wherein the bipolar faradaic membrane is in direct contact with the negative electrode.

15. The electrochemical cell according to claim 1, wherein the electrolyte is between the negative electrode and the bipolar faradaic membrane and between the bipolar faradaic membrane and the positive electrode.

16. The electrochemical cell according to claim 1, wherein the electrochemical cell is a $Li/PbCl_2$ electrochemical cell.

17. The electrochemical cell according to claim 1, wherein the negative electrode is an alloy and the electrochemical cell is a $LiPb\|PbCl_2$ electrochemical cell, a $LiBi\|PbCl_2$ electrochemical cell, a $LiPb\|SnCl_2$ electrochemical cell, a $LiSn\|SnCl_2$ electrochemical cell, a $Li-Pb\|PbBr_2$ electrochemical cell, a $Mg-Pb\|PbCl_2$ electrochemical cell, or a $Mg-Sn\|PbCl_2$ electrochemical cell.

18. The electrochemical cell according to claim 1, wherein the negative electrode is contained in an electronically conductive container.

19. The electrochemical cell according to claim 1, wherein the electrolyte is selected from the group consisting of LiCl—KCl, LiBr—KBr, and LiCl—LiBr—KBr.

20. A method of exchanging electrical energy with an external circuit, the method comprising:
    providing an electrochemical cell according to claim 1;
    connecting the electrochemical cell to the external circuit; and
    operating the external circuit so as to drive transfer of electrons between the negative electrode and the positive electrode.

* * * * *